United States Patent [19]

Bartleson

[11] Patent Number: 5,653,196
[45] Date of Patent: Aug. 5, 1997

[54] NO MESS REFILLABLE CATRIP TOYS FOR CATS

[76] Inventor: Linda J. Bartleson, 290 Spring Crook Rd., Roswell, Ga. 30075

[21] Appl. No.: 635,519

[22] Filed: Apr. 22, 1996

[51] Int. Cl.⁶ .................................................. A01K 29/00
[52] U.S. Cl. ............................................................. 119/711
[58] Field of Search ................................. 119/709, 710, 119/707, 708, 711; 446/369

[56] References Cited

U.S. PATENT DOCUMENTS

| 1,265,926 | 5/1918 | Ludlam | 119/711 |
| 4,715,840 | 12/1987 | Swift | 446/369 |
| 4,734,075 | 3/1988 | Park | 446/369 |
| 4,928,632 | 5/1990 | Gordon | 119/709 |
| 4,950,194 | 8/1990 | Gullace | 446/369 X |
| 5,090,938 | 2/1992 | Reynolds | 446/369 |

Primary Examiner—Robert P. Swiatek
Assistant Examiner—Yvonne R. Abbott
Attorney, Agent, or Firm—Robert Halper

[57] ABSTRACT

A toy designed for the amusement for a pet cat and shaped to simulate an animate or inanimate object, having little depth and made of a reenforced cotton front side and a sheepskin back side, the cotton having various colored patterns. A marker strip to indicate the region wherein a packet of catnip is to be inserted and an enclosed pocket for securing the packet inserted therein.

5 Claims, 1 Drawing Sheet

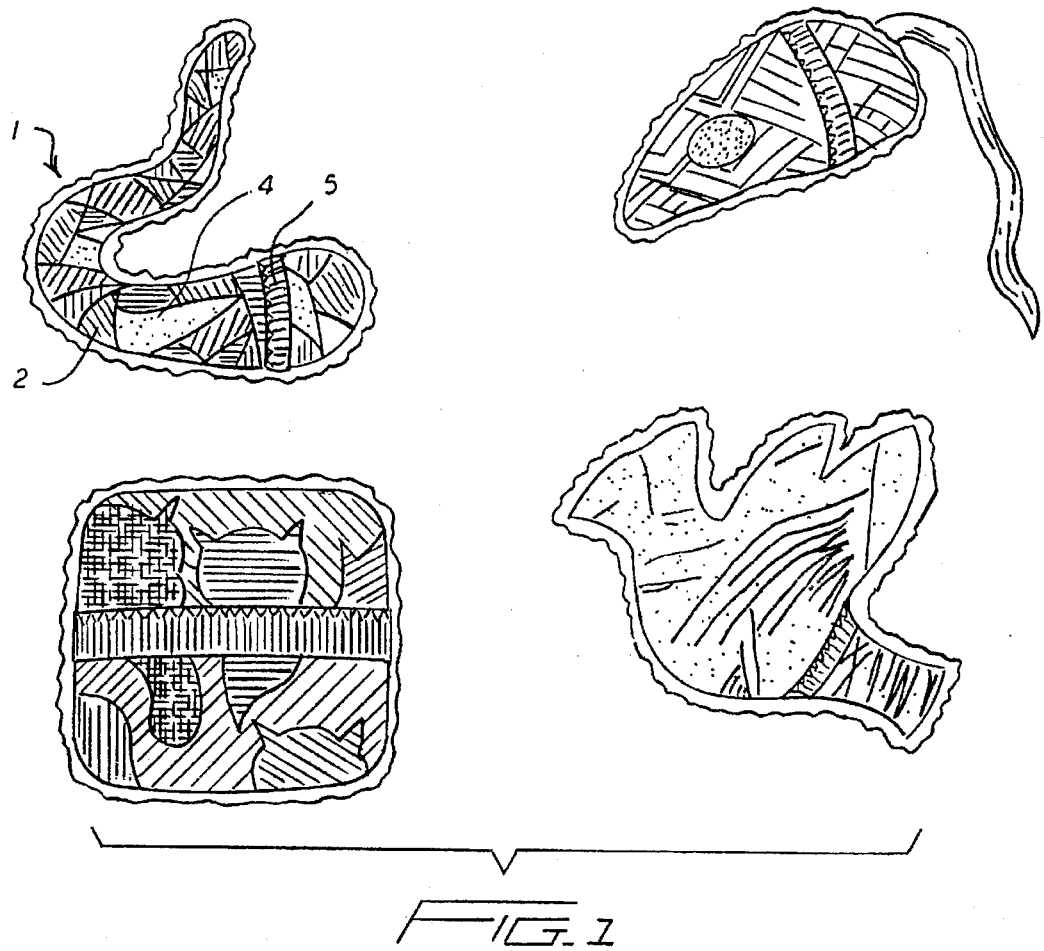
FIG. 1
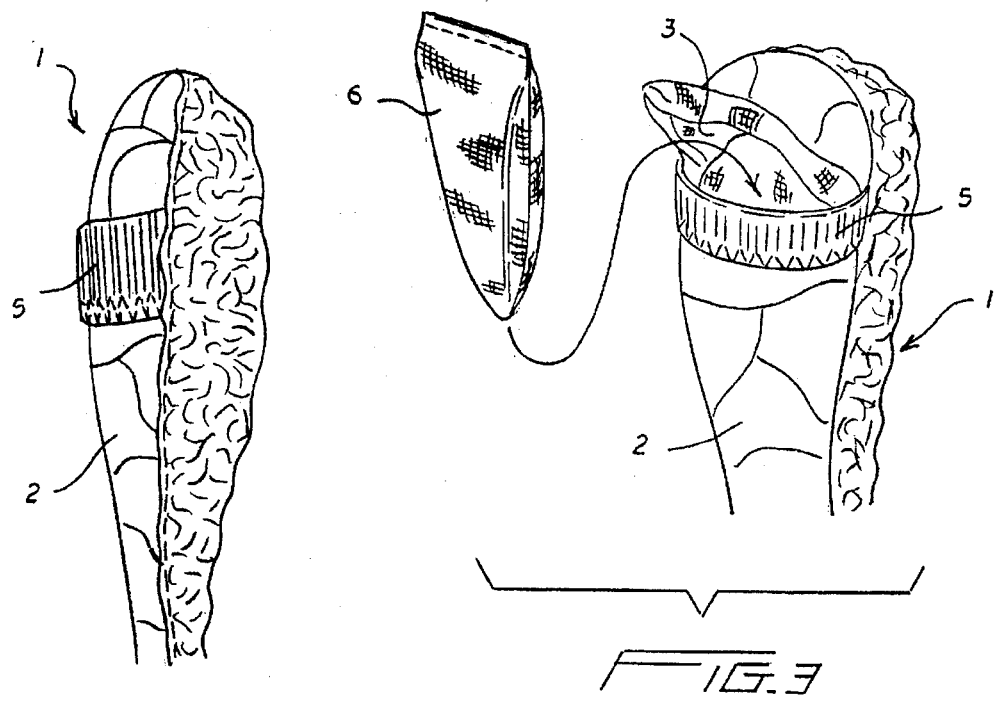
FIG. 2
FIG. 3

5,653,196

NO MESS REFILLABLE CATRIP TOYS FOR CATS

FIELD OF INVENTION

This invention pertains to toys for pets of the feline class, described as a nature collection in view of the fact that each toy simulates a creature of nature.

BACKGROUND OF THE INVENTION

A search of the art reveals that there are a number of toys for pets that contain scented compositions including catnip and that are designed to assume the shape of a variety of vertebrate and invertebrate life. Examples of the prior art are:

U.S. Pat. No. 1,031,095 teaches a method of making catnip balls wherein there are a number of apertures in the ball through which catnip odor can escape from an interior cavity filled with catnip.

U.S. Pat. No. 1,265,926 shows a fabric in the shape of a mouse filled with catnip, wherein the fabric is easily destroyed by the cat so as to retrieve the catnip.

U.S. Pat. No. 1,441,095 shows an enclosed cylindrical wire cage with a mouse like creature fastened in the center thereof, the mouse being filled with catnip.

U.S. Pat. No. 1,534,964 teaches a rubber ball having a number of apertures. A mouse made of cloth and filled with catnip is freely movable in the ball with just a portion of the mouse projecting through the apertures as the ball is rolled.

U.S. Pat. No. 4,517,922 shows a toy for a pet in the form of a mouse. The toy is resiliently suspended from a post and is made of vapor permeable durable material that is aromatized with catnip. The material is made penetrable by the animal,s claws to satisfy the cat's clawing urges.

U.S. Pat. No. 4,930,448 shows a toy device for a pet wherein the device may assume any desired shape such as a ball, mouse, butterfly, etc. The device is suspended from a cord and is made rotatable by a rotatable member contained in a housing.

U.S. Pat. No. 5,191,556 shows an amusement device for an animal in the form of a plastic or metal tube filled with ground or flake catnip having vents in the tube large enough to permit catnip odor to permeate, but small enough to prevent the catnip to escape. The tube is closed by two spherical bells that have small balls therein to produce sounds. The balls are held in tension by a spring, which can be pulled open to allow catnip replacement. The balls also have slots to further permit release of catnip scent.

Amongst the disadvantages of these pet toys is that a number of them are easily destructible after a short period of play. Additionally the catnip which has great attraction for the cat is dispersed in such a way that its essence evaporates too rapidly. Besides it is wasteful and affords no additional enhancement by being distributed throughout the entire fabric. Furthermore, except for U.S. Pat. No. '556, there is no simple way of replacement after the catnip evaporates. Finally since catnip generally comes as a ground material, it can be quite messy to remove the old catnip and replace with fresh material.

It is therefore an object of this invention to design a simulated animal toy for a cat that is made of durable fibrous material It is a further object of this invention to design the toy so that it has attractive appealing patterns.

It is still an object of this invention to place the catnip in a specially marked off area which is readily accessible for replacement.

It is also an object of this invention to package the catnip in a manner to avoid waste and unnecessary spillage.

SUMMARY OF THE INVENTION

The pet toys of this invention are generally configured to be in the form of a creature of nature whether it be a spider, a bird or a squirrel or other forms of life, although inanimate objects in the shape of pillows could also be used. The front of the toy is made of cotton having a colored design and fie back is made of sheepskin stitched to the cotton along the sides. The cotton is reenforced by a liner of sturdy strong fabric. A strip stitched to the cotton serves as a marker for insertion of catnip, which is first placed in a muslin packet and inserted in a pocket adjacent the marker. An overhanging flap is then placed in the pocket so as to cover completely the muslin packet. Such an arrangement prevents the cat from disrupting the toy and breaking into the packet.

BRIEF DESCRIPTION OF THE DRAWINGS

FIG. 1 is a front view of several examples of objects used as amusement toys for cats.

FIG. 2 is a partial side view showing the stitching of the combined fabrics.

FIG. 3 is an enlarged view in the area of the marker showing the pocket and the muslin packet.

DETAILED DESCRIPTION OF THE INVENTION

FIG. 1 as stated above shows a number of creatures of nature and an inanimate object. These toys are designed as not to be bulky, since it has been found that cat like to play with toys that do not have very great depth. For purposes of description the snake 1 will be chosen, although all the details mentioned will apply to any of the other objects. The front cover 2 is made of cotton fabrics This cover is stitched around its periphery to a backside of synthetic sheepskin. The cotton is reenforced by an internal liner 3 made of strong, durable material such as denim. As seen in the front view the outer edge of the sheepskin extends somewhat beyond the edge of the cotton fabric. The cotton fabric is made as a pattern 4 containing checkered areas of color such as purple, green, red with each checkered area defined by a gold trim. The patterns and colors vary with each type of object For example a butterfly might have an assortment of colorful butterflies offset by a blue background or a pillow might be a multi-colored. In the top region near the head of the snake is a brightly colored stitched strip 5 of denim. This strip designates the region where a packet 6 of catnip is inserted. The packet is preferably made of muslin because it has been found that this material retains the scent longer. The shape of the packet depends upon the geometry of the object. In the case of a snake the packet is formed as a segment of a circle, whereas in the pilloe the packet would be a square. The catnip used is coarsely ground. A finely ground catnip has a much greater surface area and therefore a finely ground material is more likely to evaporate faster. The shelf life of catnip is about three months and by maintaining the above described conditions, namely a muslin packet and coarsely ground material, the catnip used in the amusement devices described above generally wile last about that long. Underlying the marker strip is a pocket of a size commensurate with the packet to be inserted therein. The pocket is protected by an overlying flap that is an extension of the head of the snake. This flap folds into the pocket and covers the muslin packet in a snug fit. When replacement of the packet is necessary, it is a simple matter to lift up the flap, retrieve the worn out packet and replace it with a fresh packet. There is no mess nor any likelihood of loss of the catnip These toy objects range in size from about 1" to 4" wide to about 3" to 7" long. The use of a pocket as a closure for the catnip packet is amongst other things a safety feature. A zipper, velcro or a buttoned closure could be harmful to the cat, since they have small intestines and any ingestion of such materials as mentioned above by the cat could cause an intestinal disorder.

While a detailed description of this invention has been made, it should be understood that various modifications could be made to the disclosed details without departing from the scope of this invention as defined by the appended claims.

I claim:

1. A toy designed for the amusement of an animal of the feline class, said toy being shaped to simulate an animate or inanimate object comprising an object of small depth having a front side and a back side, said front side being made of 100% cotton, reenforced by an inner liner of a strong, durable fabric having a colored pattern, said back side being made of sheepskin and being stitched to said front side at a periphery of said sides, said front side having a marker strip stitched to said front side, said strip forming the mouth of a pocket, a muslin packet containing a quantity of coarsely ground catnip, said pocket being wide and long enough to accommodate said muslin packet when inserted therein, an overhanging flap extending from a region of said front side above said strip and fitting into said pocket and over said inserted packet in a snug fit.

2. A toy as in claim 1 wherein said inner liner is made of denim.

3. A toy as in claim 1 wherein said animate object is a creature of nature and is selected from the group comprising a butterfly, a spider, a mouse, a rabbit, a bird and a squirrel.

4. A toy as in claim 1 wherein said marker strip is a contrasting, solid color and said sheepskin back side extends somewhat beyond the cotton front side.

5. A toy as in claim 1 wherein said muslin packet is shaped to conform to the geometry of the object in which it is inserted.

* * * * *

UNITED STATES PATENT AND TRADEMARK OFFICE
CERTIFICATE OF CORRECTION

PATENT NO. : 5,653,196
DATED : Aug. 5, 1997
INVENTOR(S) : Linda J. Bartleson

It is certified that error appears in the above-identified patent and that said Letters Patent is hereby corrected as shown below:

On the title page, item [54] and column 1, in the title:

change "Catrip" to --Catnip--.

Signed and Sealed this

Twenty-fourth Day of March, 1998

Attest:

BRUCE LEHMAN

*Attesting Officer*      *Commissioner of Patents and Trademarks*